United States Patent [19]
Smith

[11] 3,785,373
[45] Jan. 15, 1974

[54] PLASTER OF PARIS BANDAGES TO MAKE WATER-RESISTANT CASTS

[76] Inventor: David F. Smith, 60 Longview Dr., Sarasota, Fla. 33577

[22] Filed: Aug. 20, 1970

[21] Appl. No.: 65,732

Related U.S. Application Data

[63] Continuation-in-part of Ser. No. 42,446, June 1, 1970, Pat. No. 3,649,319.

[52] U.S. Cl. .................................................. 128/91
[51] Int. Cl. ............................................ A61f 05/04
[58] Field of Search ................................... 128/91 R

[56] References Cited
UNITED STATES PATENTS

| | | | |
|---|---|---|---|
| 3,282,265 | 11/1966 | Smith | 128/91 R |
| 3,236,232 | 2/1966 | Smith | 128/91 R |
| 3,523,805 | 8/1970 | Smith | 128/91 R |

FOREIGN PATENTS OR APPLICATIONS

| | | | |
|---|---|---|---|
| 1,108,362 | 4/1968 | Great Britain | 128/91 |
| 1,491,190 | 3/1969 | Germany | 128/91 R |
| 117,378 | 8/1943 | Australia | 128/91 R |
| 1,416,954 | 2/1969 | Germany | 128/91 R |
| 655,050 | 1/1963 | Canada | 128/91 R |

*Primary Examiner*—Robert W. Michell
*Assistant Examiner*—David F. Smith

[57] ABSTRACT

A method of forming an orthopedic case-forming bandage is disclosed. The bandage formulation contains plaster of Paris in combination with polyvinylpyrrolidone, set accelerators, and bonding agent uniformly spread upon a backing material to yield a cast-forming bandage having increased water resistance and a weight between 38 and 48 grams per square foot.

6 Claims, No Drawings

PLASTER OF PARIS BANDAGES TO MAKE WATER-RESISTANT CASTS

This application is a continuation-in-part of my co-pending application, Ser. No. 42,446, now Pat. No. 3,649,319, series of 1970, filed June 1, 1970.

The invention resides in the discovery that certain formulations containing polyvinyl pyrrolidone polymers (herein sometimes designated as PVP) can be devised so as to produce plaster of Paris bandages that yield casts of greatly enhanced water-resistance. That is to say, such casts after being formed, set and dried in air following the usual procedure, when subsequently wet, do not show the marked deterioration in strength that characterizes the usual plaster casts. Furthermore, such casts also show excellent setting, strength and other desirable properties when tested in the usual manner, for example according to Federal Specification GG-B-101d, June 2, 1959, or Military Medical Purchase Description No. 9, Sept. 26, 1963.

Water-resistant casts are highly desirable in the practice of both human and veterinary orthopedics, since casts are often subject to contact with body fluid exudates and to wetting incident to hydrotherapy; patients wearing casts sometimes wet them during bathing, they may be wet in rain or snow and foot casts may be wet by stepping in water. The melamine resin-plaster cast made with the bandages of U.S. Pat. Nos. 2,842,138 (see col. 2, lines 34–36) and 2,842,120 (see col. 2, lines 12–14) had as a main advantage, its water-resistance; and such bandages have been sold and used in moderate volume for many years, but they can cause serious irritating and/or allergenic reations to both patients and cast-makers. My new bandages, however, use bland and inocuous materials. For example, PVP has been extensively used in cosmetic products and pharmaceuticals-even very widely as a blood-volume extender, without unwanted effects.

The following examples will illustrate my methods and products, modifications and extensions of which, within the scope of my invention, will be evident to those skilled in the art. (All proportions are by weight unless otherwise noted.)

Example 1

600 grams of corn starch dextrin (No. 7002 Globe dextrin made by CPC International Inc., Englewood Cliffs, N.J., in the usual manner by spraying hydrochloric acid on layers of corn starch spread out in chambers. It contains 2 to 6 percent cold-water-soluble material.), was stirred into 2,500 ml. water heated to 180–200°F. until a smooth, uniform solution was obtained. The solution was then cooled and weighed. 895 grams of this solution, which contained 181 grams of dextrin, was stirred into 2.8 gallons of aqua ammonia (29% $NH_3$), hereinafter sometimes called $NH_3Aq$. A solution of 181 grams PVP (PVP-K-30 provided by Antara Chemicals, a sales division of General Aniline and Film Corp., 435 Hudson St., New York 14, N.Y. and represented to have an average molecular weight of 40,000 by the osmometric method — see Frank and Levy, *J. Polymer Science*, 10, 371 (1953) and Stoner and Azorlosa, Amer. Chem. Soc. meeting, Dallas, Texas, April 1956), in 2,000 ml. water was then added with stirring. Then 329 grams of a water dispersion of water-insoluble polyvinyl acetate (Elvacet 81-900, herein sometimes called PVOAC, provided by E. I. du Pont de Nemours and Co., Wilmington, Del., containing 55 percent solid PVOAC) was stirred into the mixture. Then 15 grams casein was mixed with 362 grams powdered potassium sulfate and stirred into the mix for several minutes. Finally 40 lbs. (18,144 grams) of steam-calcined, high density, low consistency powdered (99 percent 200 mesh U.S. standard screen) plaster of Paris (made by the method of U.S. Pat. No. 1,901,051 and hereinafter sometimes called POP) was added and the mix thoroughly stirred for 10–15 minutes with a motor-stirrer. The slurry was coated on 32×28 mesh surgical gauze in amount to yield a dry bandage weighing about 230 grams per 5 sq. ft. (4 inches wide by 5 yards long) and dried for 2–3 minutes in a tenter-drier at about 240°F. The product was tested by the methods of the above-mentioned Federal Specification. It had a setting time of 3 min. 48 sec. The strength of a 4 inches × 5 yard cast at one-half hour was 590 lbs. A similar cast after standing under room conditions for about 3 days had a strength of 605 lbs. and a similar cast after standing under room conditions for about 2 days and in water for about 1 day, had a strength of 434 lbs. Thus, the wet strength was about 72 percent of the dry strength. The bandage was very well bonded and the plaster loss both dry and after wetting and squeezing out the excess water down to about 35 percent of the weight of the dry bandage, was very low. Ordinary bandages, made by the methods of the U.S. patents as listed below yield casts that retain 50 to 59 percent of the dry strength under comparable test conditions.

Example 2

In place of the PVOAC binder of Example 1, a solution of polyvinyl alcohol, sometimes hereinafter called PVALC (Covol 9870, supplied by CPC International Inc., Englewood Cliffs, N.J.) was prepared by stirring 250 grams of it into 2,500 ml. water and stirring and heating in a steam bath to about 200°F for about one-half hour until a smooth clear solution is obtained. PVALC is made by polymerizing vinyl acetate in the presence of a catalyst such as platinum and subsequently hydrolyzing in the presence of an alkali such as NaOH. The reactions are carried out in a solvent such as methanol. The solvent is subsequently recovered by evaporation and the product washed with water to remove salts such as sodium acetate. The PVALC used here is essentially insoluble in cold water, is 99 to 100 percent hydrolyzed polyvinyl acetate and its degree of polymerization is indicated by its viscosity of 60 to 70 centipoises in 4 weight percent aqueous solution at 20°C. as determined by the Hoeppler falling-ball method. (For a Hoeppler visosimeter, see E. H. Sargent and Co., Springfield, N.J., catalog edition 109, p. 1,050.) The PH of PVALC aqueous solution is 5 to 7. After dissolving in hot water, the solution can be diluted by cold water to form a smooth solution. Into 2.6 gal. aqua ammonia was stirred 1192 grams of the cold PVALC solution, which contained 118 grams PVALC (0.65 wt. percent based on the 40 lbs. plaster of Paris to be used). Then was added with stirring, a solution containing 146 grams of PVP of average molecular weight 360,000 (0.81 wt. percent of the POP to be used) in 2,095 ml. water. 10 grams of casein was mixed with 362 grams powdered potassium sulfate and added with stirring to dissolve in the foregoing mix. Then 40 lbs. POP was stirred in for 10 to 15 minutes. The slurry was coated, dried and tested as in Example 1. The cast made as in Example 1 with a 4 in. × 5 yd. bandage weighing 238 grams and containing 30 wt. % water after squeezing out, had a cast strength of 540 lbs. at one-half hour and retained 79.3 percent of its 3-day dry-strength after standing for 2 days followed by soaking in water for 1 day, as compared with the 72 percent in Example 1. The wet bandage was smooth and had a "plastic" feel. The plaster-loss was well within Federal specifications. The setting-time of the bandage was 4 minutes, 3 seconds.

Example 3

An experiment was made similar to that of Example 1, except that the amounts of dextrin and PVP were reduced to one-half — leaving 1 percent PVOAC solids, one-half percent dextrin and one-half percent PVP (ave. mol. wt. 40,000) based on the weight of POP. 87 percent of the 3-day dry-strength of the cast remained after soaking in water for 1 day.

Example 4

This experiment was similar to that of Example 3 except that twice as much PVP (ave. mol. wt. 40,000) relative to POP, was used. 90.3 percent of the 3-day dry-strength of cast remained after soaking in water for 1 day.

Example 5

This experiment was carried out as in Example 1, except that no dextrin and no PVOAC binder were used and twice the PVP relative to POP was used. Thus, the slurry contained 2.6 gal. aqua ammonia, 362 grams PVP (ave. mol. wt. 40,000) dissolved in 2,500 ml. water, 10 grams casein, 362 grams potassium sulfate and 40 lbs. POP. Excellent cast strength was obtained in spite of a high loss of plaster upon wetting the bandage and squeezing out excess water. Similar experiments with 0.5 to 5 percent of the weight of plaster of PVP of average molecular weight of 160,000 or 360,000 gave bandages with smaller loss of plaster but still higher than with ordinary POP bandages.

The products of all of the above examples, showed setting-time in the normal range from 3 min. 15 seconds to 5 minutes and the set can be controlled in known manner by adjustment of the amount of potassium sulfate set-accelerator used and by other well-known means as disclosed in the patents referred to herein.

When I characterize a material as cold-water-insoluble, I mean "very slightly" soluble or of a solubility low enough to be of little consequence from the standpoint of its amount in the slurry-liquid used.

I may use, as I have in Example 1, what I call a "softening agent" in any of my formulations, comprising the dextrin of Example 1 or the hydrolyzed, ethylated starch as described hereinafter, in amount from 0.25 to 2 percent of the weight of plaster of Paris. These materials are used as illustrated in Example 1 by dissolving them in hot water and subsequently cooling the solution before adding the solution to the slurry. Or, as softening agent I may use the same proportions of hydroxypropyl methyl cellulose or hydroxyethyl ethyl cellulose, although I prefer dextrin or the hydrolyzed, ethylated starch. Such softening agents give a smoother feel to the wet bandage. As a cast is made and in the case where the polyvinyl alcohol binder is used, they avoid the presence of "curds" in the wet bandage although if sufficient PVP is used (at least equal to the amount of PVALC used) the PVP acts to prevent the formation of these curds which the user finds undesirable. Normally I wish to use no more PVALC (0.25 to 1 percent of the weight of POP), than is required to yield an acceptable wet plaster-loss, because of the appearance of this "inhomogeneity" in the wet bandage. Likewise, the other binders such as PVOAC normally should also not be used in excessive amounts (not over 0.5 to 2 percent and preferably 1 percent of the weight of POP), since they tend to give the wet bandage a harsh feel and tend to interfere with rapid wetting of the bandage.

It should be pointed out that, as far as absolute values of cast strength are concerned, one expects higher values in commercial type operation where runs are long enough to adjust the several variables to optimum values. However, the above experiments were carried out by strictly comparable procedures and the tests were comparably made by experienced technicians whose test results are consistent.

The results show the marked improvement in water-resistance of casts made from the bandages of the present invention. They also show that PVP must be combined with at least a suitable bonding agent such as PVALC of the type used herein or PVOAC dispersion in a non-solvent such as water, in order to yield an acceptable bandage; and preferably, with an additional material such as dextrin. In place of the dextrin used, other dextrins may be used but from the standpoint of plaster loss a dextrin with from 2 to 10 wt.% cold-water solubles is preferred. In place of dextrin an ethylated and hydrolyzed starch with a cold-water solubility of about 2 to 10 wt. % can be used. Such a product (called Eosize and made by CPC International, Inc.) is made by reacting unmodified starch in alkaline solution with ethylene oxide, with NaCl as catalyst, until the degree of substitution of hydroxyl groups in the starch is an average of about 0.06, to form the hydroxyethyl ether of starch. The product is washed with water to remove salts and then acid (HCl) hydrolyzed in water to form products of lower viscosity and higher cold water solubility. I designated such products as hydrolyzed, ethylated starch. They are dissolved in hot water as with dextrin and used similarly in the present invention.

The theory of the action of PVP in so markedly increasing water-resistance of casts cannot be presented with certainty, but PVP is known to have complexing action with several types of compounds, organic and inorganic. Unlike many other materials, it is physiologically acceptable and does not appreciably interfere with setting. It is a cold-water-soluble and hygroscopic polymer or resin and of itself is not an acceptable bonding agent. Bandages containing PVP must be protected from moisture in storage and, preferably, should be sealed inside polyethylidene chloride (Saran) film, metal foil such as aluminum foil, metal foil laminated to paper, metal cans or other equally moisture-vapor-proof material. The water-resistance of casts of the invention can be demonstrated qualitatively but very definitely by carefully laying a drop of water on the dry cast and determining the time required for the drop to absorb into the surface — a time that is longer than is the case with ordinary casts. But, in spite of the water-resistance as shown by the small loss of strength of the wetted cast, it still is not so impervious to water and water-vapor as to cause discomfort to the wearer of the cast or to cause maceration of the skin. Again, unlike the melamine resin — POP casts mentioned above, the present cast does not present greatly increased difficulty of removal of the cast after it has served its purpose.

As to the bonding agents used herein, they appear to hold down loss of PVP as well as POP in wetting and squeezing out excess water from the bandage and the particular types used herein may also, in combination with the PVP, contribute to water-resistance of the cast. A dispersion of PVOAC is a non-solvent must be used — not a solution — since the latter results in so covering up the POP particles as to interfere with adequately wetting the bandage. The PVALC used must also be a cold-water-insoluble type. Cold-water-soluble materials will not prevent large loss on wetting and squeezing-out excess water from the bandage. (See U.S. Pat. No. 2,655,148, paragraph starting at the bottom of col. 1).

I may use PVP in the manner herein disclosed with any of what I call "water-slurry" methods of making plaster of Paris bandages where minor amounts of decomposable and/or volatile set-inhibitor are used to prevent setting of the POP during processing, as disclosed in U.S. patents as follows: (1) No. 2,557,083 by Eberl, issued June 19, 1951, wherein ammonium borate is the set-inhibitor; (2) No. 3,294,087 by Smith, issued Dec. 27, 1966, wherein ammonium borate plus ammonia are used; (3) No. 3,191,597 by Smith, issued June 29, 1965, wherein ammonium caseinate is used; (4) No. 3,223,082 by Smith, issued Dec. 14, 1965, wherein cellulose acid ethers are used; (5) No. 3,282,265 by Smith, issued Nov. 1, 1966, wherein ammonium caseinate and ammonia are used; (6) No. 3,523,806 by Smith, issued Aug. 11, 1970, wherein dextrin and ammonia are used. Since PVP is soluble in volatile organic solvents, I may dissolve it in methanol, ethanol, propanol, acetone, or isopropanol and add powdered potassium sulfate set-accelerator, PVOAC dispersion as binder and powdered POP to make a non-aqueous slurry that is coated and dried as with water slurries. The PVOAC dispersion can be in water or in the specified organic liquid. Normally I add to these organic liquids up to about 5 to 25 wt. % water in any case, so that if a water dispersion of PVOAC is used, its water content can be allowed for in adding the 5 to 25% of water. I may also use the method of U.S. Pat. No. 3,523,805 by Smith, issued Aug. 11, 1970, wherein a methanol slurry-liquid containing 5 to 25% water is used with a zein binder.

PVP of molecular-weight in the range from 15,000 to 360,000 may be used but I prefer material with average molecular weight 40,000 to 360,000 and, from the standpoints of cost and availability, material of 40,000 average molecular-weight is advantageous.

Proportions of ingredients I use are as follows, in percent by weight of the POP used: (1) dextrin, 0.25 to 2 percent, preferably one-half to 1 percent; (2) PVOAC, 0.25 percent to 3 percent, preferably one-half to 2 percent; (3) PVALC, 0.25 to 1.5 percent, preferably one-half to 1 percent; (4) PVP, one-half to 5 percent, preferably one-half to 1½ percent; (5) hydrolyzed, ethylated starch, 0.25 to 2 percent, preferably one-half to 1 percent; (6) potassium sulfate, 0.25 to 2.5 percent, preferably 0.5 to 2 percent; (7) casein, 0.02 to 2 percent; (8) boric acid, 0.05 to 2 percent; (9) zein, 0.25 to 3.0 percent; (10) cellulose acid ether, 0.2 to 2 percent. The water-slurry liquid can contain from 0.05 to 20% $NH_3$, based on the weight of $NH_3$ plus water. When I use PVALC as binder, I may use up to 10 percent of its weight of boric acid to increase its adhesiveness. I may use a 99 to 100 percent hydrolyzed PVALC of viscosity (determined as above described) down to about 25 centipoises although the higher viscosity material has better bonding properties. A highly hydrolyzed (99–100 percent) high viscosity (60–70 cps.) PVALC, when used along, especially at the higher proportion of 1 to 1.5 percent of the weight of POP, gives a curdy feel to the wet bandage which is eliminated by the presence of dextrin, PVP or hydrolyzed, ethylated starch or mixtures of these materials in amount from about one-half to twice the amount of PVALC used. This curdy feel can also be eliminated by addition of methyl cellulose, hydroxypropyl methyl cellulose or hydroxyethyl ethyl cellulose in amount from one-third to a weight equal to that of the PVALC.

The surgical gauze cited in the examples as a backing material may be replaced by other essentially inert, porous, flexible, water-absorbent backing material and the weight of coating thereon can vary from about 180 to 240 grams per 5 square feet. The weight of 5 sq. ft. of the 32×28 mesh surgical gauze normally used as backing, is about 18 grams.

The PVOAC and similar water-insoluble polyvinyl polymer and copolymer binders are described in U.S. Pat. No. 2,566,148 by Eberl and Ingram and include copolymers of vinyl acetate and acrylate or methacrylate esters, characterized by heat-sealing or softening temperatures from 200 to 260°F. and are in the form of dispersions of fine, discrete particles in water or other inert, volatile non-solvent. However, I prefer the PVOAC.

The general procedure in using a water-slurry process is to make up a slurry-liquid comprising a major proportion of water containing the following materials in the proportions indicated: (1) boric acid, 0.1 to 2 percent of the weight of POP to be used and $NH_3$, 0.1 to 20 percent of the weight of water plus $NH_3$, or (1a) casein, 0.01 to 1 percent of the weight of POP to be used and $NH_3$ 0.05 to 20 percent of the weight of water plus $NH_3$; (2) PVOAC, 0.25 to 3 percent of the weight of POP on the basis of solids in a dispersion of it in water or other inert, volatile non-solvent or cold-water-insoluble PVALC made from 99 to 100 percent hydrolyzed polymerized PVOAC, the PVALC having a viscosity of 25 to 70 cps. in 4 wt. % aqueous solution at 20°C. as determined by the Hoeppler falling-ball method, said PVALC being in aqueous solution obtained by dissolving it in hot water and then cooling the solution, in amount of PVALC to provide 0.25 to 1.5 percent of the weight of POP to be used; (3) powdered potassium sulfate (at least as fine as to pass a 100 mesh U.S. standard screen), 0.25 to 2.5 percent of the weight of POP to be used; (4) dextrin, 2 to 10 percent by weight of cold-water soluble material, being in aqueous solution obtained by dissolving it in hot water and then cooling the solution, in amount to provide 0.25 to 2 percent of the weight of POP to be used; or hydrolyzed, ethylated starch, with a degree of substitution of hydroxyl groups of up to about 0.06 and 2 to 10 wt.% cold-water-soluble, being in aqueous solution obtained by dissolving in hot water and then cooling the solution, in amount to provide 0.25 to 2 percent of the weight of POP to be used; (5)PVP in amount between 0.5 and 5 percent of the weight of POP to be used and of average molecular-weight in the range from 15,000 to 360,000. The PVP is readily soluble in the slurry-liquid. The mix is thoroughly stirred to break up aggregates, dissolve all soluble materials and make a homogeneous mix. The proportion of water is such as to give a sufficient concentration of set-inhibitors, ammonium borate, ammonium caseinate and/or $NH_3$ to retard the set for at least the time required to carry out the processing — a continuous method requiring less time than a batch process. The amount of POP relative to slurry-liquid is adjusted to suit the method of coating used—a thick slurry for a knife coater and a thin slurry for a roll coater. The slurry is then coated on an absorbant, porous, flexible, inert backing material—generally 32×28 mesh surgical gauze as defined by Federal specifications and referred to in the above-quoted publications, or the U.S. Pharmacopoeia. The coating weight are as above noted and the coated material is then dried at a temperature of from 190 to 260°F., preferably in a circulating air oven or a tenter-drier, until but not substantially beyond the point where, after holding the dried product for a few hours at room temperature, protected from moisture, there is no gritty feel in the wetted bandage beyond what may have existed in the original plaster. The product is then slit to desired widths, rolled and packaged without undue exposure to warm, humid atmosphere, in a package as described above to protect it from moisture.

With an organic slurry-liquid, one uses ethanol, methanol, propanol, isopropanol or acetone with 5 to 25 wt.% water. Zein (corn protein), as binder, is dissolved therein in amount from 0.25 to 3 wt.% of the POP to be used, or a similar amount of PVOAC solids, in form of a dispersion or emulsion in water or other inert, volatile non-solvent. Powdered potassium sulfate preferably at least as fine as to pass a 200-mesh U.S. standard screen) is added in amount from 0.25 to 2.5 percent of the weight of POP to be used and 0.5 to 5 percent of the weight of POP, of PVP of average molecular weight from 15,000 to 360,000. The mix is then thoroughly stirred to dissolve all materials soluble in the slurry-liquid. The slurry is then coated, and the coated backing dried, slit, rolled and packaged as before, the proportion of POP to slurry-liquid being chosen as before to suit the coating method.

Having thus described my invention, what I claim is:

1. A method of making a plaster of Paris water resistant orthopedic cast-forming bandage which comprises the steps of:
   1. slurring powdered plaster of Paris in a volatile liquid mixture comprising (a) a compound selected from the class consisting of methanol, ethanol, propanol, isopropanol, acetone, and 5 to 25 percent aqueous solutions thereof, and water containing a plaster of Paris set-inhibitor selected from the group consisting of ammonium borate in an amount from about 0.1 to 2.0 percent by weight of the plaster of Paris, ammonium caseinate in an amount from about 0.01 to 1.0 percent by weight of the plaster of Paris, dextrin in the form of particles formed by dissolving said dextrin in a hot aqueous solution and subsequently cooling said solution, in an amount from 0.25 to 2 percent by weight of the plaster of Paris, and mixtures of said inhibitors with ammonia, the total amount of water in said slurry liquid mixture being adjusted to provide a sufficiently high concentration of said set inhibitors to delay the set of the plaster of Paris for a time at least as long as required to complete the slurry thereof;
   2. dissolving in said step 1 slurry an amount from 0.5 to 5 percent by weight of the plaster of Paris of polyvinylpyrrolidone having a molecular weight of between 15,000 and 360,000;
   3. adding to the step 2 slurry a set accelerator of powdered potassium sulfate in an amount from 0.25 to 2.5 percent by weight of the plaster of Paris;
   4. adding to the step 3 slurry at least one water insoluble bonding agent in an amount from 0.25 to 3.0 percent by weight of the plaster of Paris and selected from the class consisting of zein, a cold-water insoluble polyvinyl acetate polymer in the form of dispersed particles having a softening temperature between 200 and 260°F., vinyl acetate-acrylic ester copolymer in the form of dispersed particles in a volatile, inert non-solvent and having a heat sealing temperature of between about from 200 to 260°F., vinyl acetate-methacrylic ester copolymer in the form of dispersed particles in a volatile, inert non-solvent and having a heat sealing temperature of between about from 200 to 260°F. and polyvinyl alcohol in the form of dispersed particles within a cooled solution derived from 99 to about 100 per cent hydrolysis of polyvinyl acetate, said cooled solution being obtained by dissolving said polyvinyl alcohol in hot water and then cooling said water to obtain a polyvinyl alcohol having a viscosity at 4 weight per cent concentration of 25 to 70 centipoises at 20°C. as determined by the Hoeppler falling-ball method;
   5. uniformly spreading said step 4 slurry onto an inert, flexible, porous backing material in such an amount as to yield, after drying said coated backing material at a temperature of about 190 to 260°F., a product weighing between from about 36 to 48 grams per square foot of the finished product.

2. The method of claim 1 wherein there is further added to the said step 4 slurry a softening agent comprising hydrolyzed, ethylated starch with a degree of ethylation of not over about 0.06 percent, in amount from 0.25 to 2 percent of the weight of plaster of Paris.

3. The method of claim 1 wherein the average molecular weight of the said polyvinylpyrrolidone is about 40,000.

4. The method of claim 1 wherein the said bonding agent is the said polyvinyl alcohol.

5. The method of claim 1 wherein the said bonding agent is the said polyvinyl acetate.

6. The method of claim 1 wherein the said zein is in the form of a solution in the said 5 to 25 percent aqueous solution of step 1.

* * * * *